United States Patent
Friebe

(10) Patent No.: US 10,227,042 B2
(45) Date of Patent: Mar. 12, 2019

(54) DEVICE AND METHOD FOR PROVIDING INFORMATION DATA WITH RESPECT TO AN OBJECT OF A VEHICLE ENVIRONMENT CONTAINED IN A VIDEO IMAGE STREAM

(71) Applicant: Conti Temic microelectronic GmbH, Nürnberg (DE)

(72) Inventor: Markus Friebe, Gefrees (DE)

(73) Assignee: CONTI TEMIC MICROELECTRONIC GMBH, Nürnberg (DE)

( * ) Notice: Subject to any disclaimer, the term of this patent is extended or adjusted under 35 U.S.C. 154(b) by 0 days.

(21) Appl. No.: 15/309,323

(22) PCT Filed: Apr. 24, 2015

(86) PCT No.: PCT/DE2015/200279
§ 371 (c)(1),
(2) Date: Feb. 17, 2017

(87) PCT Pub. No.: WO2015/169310
PCT Pub. Date: Nov. 12, 2015

(65) Prior Publication Data
US 2017/0158131 A1    Jun. 8, 2017

(30) Foreign Application Priority Data
May 8, 2014  (DE) .......................... 10 2014 208 663

(51) Int. Cl.
*H04N 7/18*  (2006.01)
*B60R 1/00*  (2006.01)
*G01C 21/36* (2006.01)
*B60K 35/00* (2006.01)
(Continued)

(52) U.S. Cl.
CPC ................ *B60R 1/00* (2013.01); *B60K 35/00* (2013.01); *G01C 21/3647* (2013.01);
(Continued)

(58) Field of Classification Search
USPC ..................................................... 348/148, 61
See application file for complete search history.

(56) References Cited

U.S. PATENT DOCUMENTS

| 8,718,822 B1 | 5/2014 | Hickman et al. |
| 2005/0182564 A1 | 8/2005 | Kim |

(Continued)

FOREIGN PATENT DOCUMENTS

| DE | 102006030278 A1 | 1/2008 |
| DE | 102008051756 A1 | 5/2009 |

(Continued)

OTHER PUBLICATIONS

International Search Report and Written Opinion dated Apr. 24, 2015 from corresponding International Patent Application No. PCT/DE2015/200279.

(Continued)

*Primary Examiner* — Daquan Zhao

(57) ABSTRACT

A camera surround view system for a vehicle includes at least one vehicle camera, which provides camera images. The camera images are processed by a data processing unit in order to produce a live video image stream, which is displayed on a display unit. The camera surround view system loads local cloud information data regarding an object shown in the live video image stream from a data network and displays the obtained local cloud information data as an overlay in the displayed live video image stream.

12 Claims, 2 Drawing Sheets

(51) Int. Cl.
*G06K 9/00* (2006.01)
*G01C 21/20* (2006.01)

(52) U.S. Cl.
CPC .... *G06K 9/00791* (2013.01); *B60K 2350/106* (2013.01); *B60K 2350/1028* (2013.01); *B60K 2350/1076* (2013.01); *B60K 2350/2013* (2013.01); *B60K 2350/2052* (2013.01); *B60R 2300/205* (2013.01); *B60R 2300/302* (2013.01); *B60R 2300/80* (2013.01)

(56) References Cited

U.S. PATENT DOCUMENTS

| | | |
|---|---|---|
| 2009/0315766 A1 | 12/2009 | Khosravy et al. |
| 2011/0006977 A1 | 1/2011 | Khosravy et al. |
| 2012/0033069 A1 | 2/2012 | Becker et al. |

FOREIGN PATENT DOCUMENTS

| | | | |
|---|---|---|---|
| DE | 102012208733 A1 | 11/2013 | |
| DE | 102012013503 A1 | 1/2014 | |
| EP | 0867690 | * 9/1998 | ............. G01C 21/20 |
| EP | 0867690 A1 | 9/1998 | |
| EP | 1519154 A1 | 3/2005 | |

OTHER PUBLICATIONS

German Search Report dated Apr. 22, 2015 for corresponding German Patent Application No. 10 2014 208 663.9.

\* cited by examiner

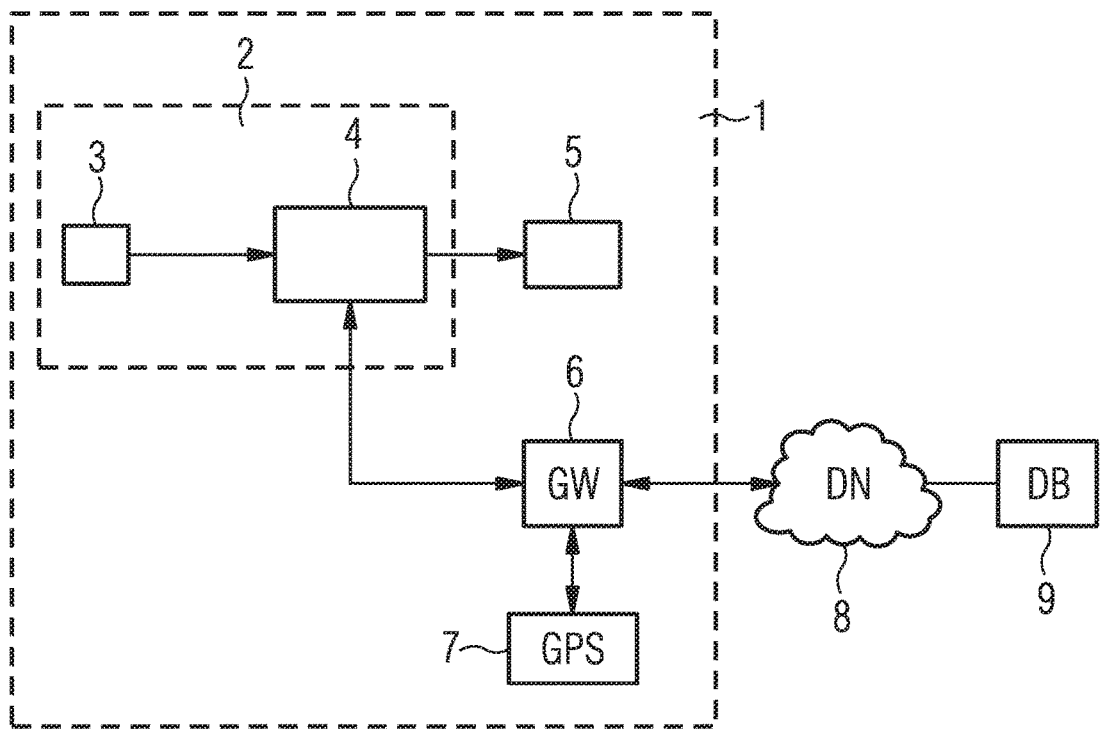
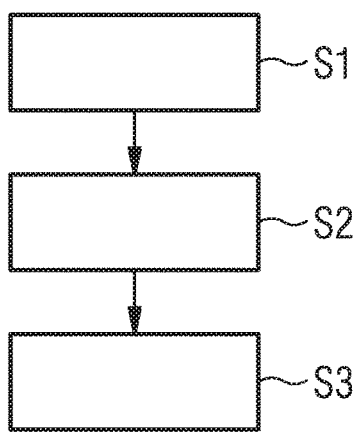

DEVICE AND METHOD FOR PROVIDING INFORMATION DATA WITH RESPECT TO AN OBJECT OF A VEHICLE ENVIRONMENT CONTAINED IN A VIDEO IMAGE STREAM

TECHNICAL FIELD

The technical field relates generally to a device and a method for providing information data with respect to an object of a vehicle environment of a vehicle, in particular a road vehicle, contained in a video image stream.

BACKGROUND

Vehicles, in particular road vehicles, are increasingly being fitted with driver assistance systems, which assist the driver of the vehicle in driving the vehicle and performing driving maneuvers. In some instances, such driver assistance systems include camera surround view systems having one or more vehicle cameras. These vehicle cameras supply camera images, which are displayed to the driver of the vehicle on a display unit of the vehicle. These camera images assist the driver, for example when reversing the vehicle or parking the vehicle in a parking space.

In many cases conventional vehicles also have a navigation system, which provides positional data of the vehicle and guides the driver along a route to a navigation destination. Here the driver is able to follow a route from a street map that is displayed, and direct the vehicle to the travel destination by following the instructions from the navigation system.

During the journey to his travel destination, the driver will often notice certain objects located in the vehicle environment, such as buildings or prominent landmarks, which are of interest to him for a number of reasons. If, for example, a driver is travelling in his vehicle through a city or district, or through an industrial park or similar, they may notice certain objects, especially buildings, about which they would like more information. For example, the driver may wish to know which corporation owns an office building. A driver passing through a city in his vehicle may also identify objects of interest about which they would like to find out more.

Conventional camera surround view systems or driver assistance systems do not allow the driver to receive immediate information on the objects of interest to them in the video image stream and/or the camera images displayed.

It is therefore desirable to provide a method and a device allowing the driver to receive additional information on interesting objects in the vehicle environment. In addition, other desirable features and characteristics will become apparent from the subsequent summary and detailed description, and the appended claims, taken in conjunction with the accompanying drawings and this background.

SUMMARY

In accordance with one exemplary embodiment, a camera surround view system for a vehicle comprising at least one vehicle camera, which supplies camera images, which are processed by a data processing unit in order to produce a live video image stream, which is displayed on a display unit, wherein the camera surround view system loads local cloud information data regarding an object shown in the live video image stream from a data network and displays the obtained local cloud information data as an overlay in the displayed live video image stream.

In a possible embodiment of the camera surround view system, the local cloud information data are downloadable from the data network as a function of a current position, direction of travel and/or speed of travel of the vehicle and the selected object.

In a further possible embodiment of the camera surround view system, the selected object of interest is selected by a driver of the vehicle or a passenger located in the vehicle via a user interface.

In a further possible embodiment of the camera surround view system, the object of interest is selected by the driver or passenger, by the driver or passenger touching the object displayed on the display unit.

In a further possible embodiment of the camera surround view system, the surround view system is connected to a gateway providing a wireless connection to the data network.

In a further possible embodiment of the camera surround view system, the current position, direction of travel and/or speed of travel of the vehicle are provided by a GPS unit of the vehicle.

In a further possible embodiment of the camera surround view system, a pointer from camera coordinates of the selected object, shown in the live video image stream, to GPS coordinates is calculated and a request sent via the wireless connection, in order to receive the cloud information data associated with the object from a database of the data network.

In a further possible embodiment of the camera surround view system, the surround view system receives a list of GPS coordinates and associated local cloud information data from the database of the data network via the wireless connection and calculates a pointer from the GPS coordinates to the camera coordinates, at the position of which the local cloud information data are placed in the displayed live video image stream.

In accordance with another exemplary embodiment, a driver assistance system with a camera surround view system for a vehicle comprising at least one vehicle camera, which provides camera images, which are processed by a data processing unit in order to produce a live video image stream, which is displayed on a display unit of the vehicle. The camera surround view system loads local cloud information data regarding an object shown in the live video image stream from a data network and displays the obtained local cloud information data as an overlay in the displayed live video image stream.

In accordance with a yet another exemplary embodiment, a method for providing information data with respect to an object of a vehicle environment of a vehicle contained in a video image stream includes producing camera images of the vehicle environment by means of at least one vehicle camera of the vehicle. The method also includes processing the produced camera images to generate a live video image stream of the vehicle environment and displaying the generated live video image stream on a display unit of the vehicle. The cloud information data regarding a selected object in the live video image stream are displayed as an overlay in the live video image stream.

A vehicle with a driver assistance system containing a camera surround view system according to one exemplary embodiment is also provided.

BRIEF DESCRIPTION OF THE DRAWINGS

In the following, possible embodiments of the method and the device for providing information data with respect to an object of a vehicle environment of a vehicle contained in a video image stream are explained in more detail with reference to the attached figures.

These show as follows:

FIG. 1 is a block diagram representing an embodiment of the camera surround view system according to one exemplary embodiment;

FIG. 2 is a flow diagram representing an embodiment of the method for providing information data with respect to an object of a vehicle environment contained in a video image stream;

DETAILED DESCRIPTION

Figure 3:
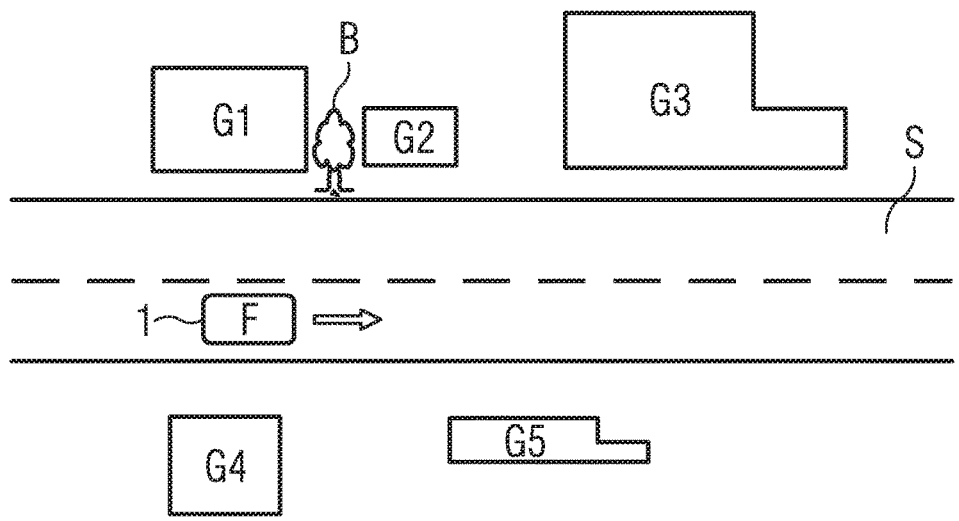
FIG. 3 is a schematic representation of an application to explain the functioning of the method and of the camera surround view system.

As can be seen in FIG. 1, in the application example shown a vehicle 1, in particular a road vehicle, for example an automobile or truck, has a camera surround view system 2. The camera surround view system 2 contains at least one vehicle camera 3, which supplies camera images of the vehicle environment, which are processed by a data processing unit 4 of the camera surround view system 2 in order to produce a live video image stream, which is displayed on a display unit 5. The live video image stream is for example displayed on a display inside the passenger compartment to the driver or a passenger of the vehicle 1. In a possible embodiment, the data processing unit 4 of the camera surround view system 2 contains one or more microprocessors for processing the camera images received into a live video image stream of the vehicle environment. The number of vehicle cameras 3 may vary according to the type and size of the vehicle 1. For example, a larger vehicle 1, for example a truck or a cruise liner, can have plurality of vehicle cameras 3, which are processed by the data processing unit 4 into a complex live video image stream.

The data processing unit 4 is connected via data cables or a data bus to a gateway 6 of the vehicle. The data bus is for example an Ethernet data bus. In the embodiment shown, the gateway 6 is connected via a further vehicle bus, for example a CAN bus, with a GPS unit 7 of the vehicle, which supplies GPS coordinates on the current position of the vehicle 1. The GPS unit 7 can be part of the navigation system of the vehicle 1. The gateway 6 is connected via a wireless interface, for example a mobile radio interface, with a data network 8. The mobile interface can for example be a UMTS interface. The data network 8 has one or more databases 9, in which cloud information data is stored. The system shown in FIG. 1 can have further components, for example data memories or data buffers for storing temporarily downloaded cloud information data. The camera surround view system 2 shown in FIG. 1 receives local cloud information data regarding an object shown in the live video image stream to the data network 8 via the wireless interface and the gateway 6 and displays the obtained local cloud information data as an overlay in the live video image stream displayed on the display unit 5. Here the local cloud information data are downloaded from the database 9 of the data network 8 preferably as a function of a current position, the direction of travel and/or the speed of travel of the vehicle 1 and the selected object. The information concerning the direction of travel and the speed of travel of the vehicle 1 are preferably supplied by further sensor units of the vehicle 1 not shown in FIG. 1.

In a possible embodiment of the camera surround view system 2, the object of interest, for example a building on the side of the street, is selected by a driver of the vehicle 1 or a passenger located in the vehicle via a user interface. In a possible embodiment, the user interface forms the display unit 5 as a touchscreen. In this embodiment, the object of interest is selected by the driver or passenger touching the object displayed on the display 5.

In a possible embodiment of the camera surround view system 2, the data processing unit 4 of the surround view system 2 calculates a pointer from camera coordinates of the selected object, which is shown in the live video image stream on the display unit 5, to GPS coordinates and then generates a request, which is sent via the wireless connection, in order to receive the cloud information data associated with the selected object from the database 9 of the data network 8. In a possible embodiment, the data processing unit 4 of the surround view system 2 receives, via the wireless connection, in response to the query, a list of GPS coordinates and associated local cloud information data from the database 9 of the data network 8 and then calculates a pointer from the GPS coordinates to the camera coordinates, at the position of which the local downloaded cloud information data are placed in the live video image stream by the data processing unit 4.

A number of variants of the camera surround view system 2 are possible. In the embodiment shown in FIG. 1 the insertion of the local cloud information data in the live video image stream is performed by the data processing unit 4 of the camera surround view system 2. In an alternative embodiment the insertion of the local cloud information data in the video image stream is performed by a further separate data processing unit of the surround view system 2. In a further embodiment the data processing can also be performed remotely by a processing unit or a server of the data network 8, wherein the latter produces a live video image stream, in which cloud information data with respect to selected objects are already inserted and this prepared video image stream is sent back via a wireless interface to a receiver unit of the camera surround view system 2.

In possible applications the insertion of the cloud information data in the live video image stream preferably takes place in real time with the minimum possible time delay. In these applications the data processing is preferably performed by the data processing unit 4 within the camera surround view system 2. In other applications the local cloud information data can also be inserted with a slight time delay in the live video image stream, so that in these applications data preparation by a data processing unit outside of the vehicle 1 is also possible.

FIG. 2 shows a flow diagram representing an exemplary embodiment of the method for providing information data, in particular cloud information data, with respect to an object of a vehicle environment of a vehicle contained in a video image stream.

In a first step S1 initially camera images are produced by at least one vehicle camera of the vehicle 1, representing a vehicle environment of the vehicle. In a possible embodiment the vehicle has a plurality of vehicle cameras, representing the entire vehicle environment, e.g. 360°, around the vehicle.

In a further step S2 the produced camera images are processed to generate a live video image stream of the vehicle environment. This data processing can for example be performed by the data processing unit 4 shown in FIG. 1 of a camera surround view system 2.

In a further step S3 the generated live video image stream is displayed on a display unit 5 of the vehicle 1, wherein cloud information data regarding a selected object are displayed in the live video image stream as an overlay in the live video image stream. The selected object of interest is selected by a driver of the vehicle 1 or a passenger located in the vehicle 1 via a user interface. The object of interest may be selected by the driver or passenger, by the driver or passenger touching the object displayed, for example a displayed building, on the display unit 5 of the camera surround view system 2. The cloud information data displayed in step S3 may be downloaded from a database of a data network, wherein local cloud information data, pertaining to the selected object, are downloaded from the data network as a function of a current position, direction of travel, and/or speed of travel of the vehicle 1, as a function of the selected object, from a database. The current position, direction of travel, and/or speed of travel are made available by a GPS unit or further sensor units of the vehicle 1 to the respective data processing unit. In a possible embodiment, a pointer from camera coordinates of the selected object, contained in the live video image stream, to GPS coordinates is calculated. Then a request is sent via a wireless connection, in order to receive the cloud information data with respect to the selected object from the database of the data network. In a possible embodiment a list of GPS coordinates and associated local cloud information data are received from the database of the data network and then a pointer from the GPS coordinates to the camera coordinates, at the position of which the local cloud information data are placed in the displayed live video image stream, is calculated by the data processing unit.

FIG. 3 shows a diagram to explain the functioning of the method and of the device for providing information data with respect to an object of a vehicle environment of a vehicle contained in a video image stream. In the example shown in FIG. 3 a vehicle 1 is moving along a street S within a city area, wherein various buildings G1 to G5 are positioned on the side of the street. The buildings may, for example, be office buildings, private houses, public buildings or historic buildings. Apart from the buildings shown in FIG. 3 there may also be further static objects on the side of the street S, such as for example statues, monuments or trees. Further examples of static objects are bridges or sports stadiums and similar. If, for example, vehicle 1 passes a building with a restaurant that appeals to the driver, he can tap on the object displayed in the live video image stream or touch the screen at this point and immediately receive cloud information data on this selected object, e.g. on the selected restaurant. These information data, in particular cloud information data, are preferably displayed on the screen in the immediate vicinity of the object or as an overlay on top of the object displayed.

Figure 4:
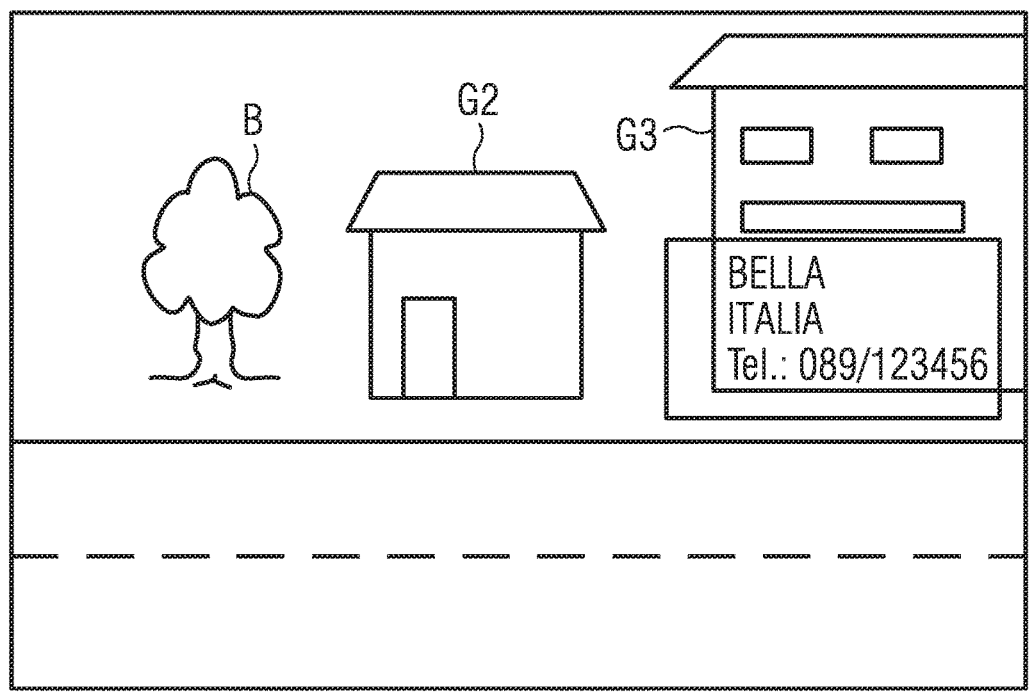
FIG. 4 is an exemplary display on a display unit in the application shown in FIG. 3 explaining the functioning of the method and the device for providing information data.

FIG. 4 is a schematic representation of a possible display on a display unit 5 of the camera surround view system 2. In the simple example there are two objects G2, G3 on the left-hand side of the street S, wherein the driver of the vehicle 1 is interested in object G3. In this building G3 there is, for example, an Italian restaurant, where the driver of the vehicle may want to reserve a table that evening. As soon as the driver has driven past a tree B, he taps on the building G3 and selects this as an object. Then, from the speed of travel, the vehicle position and the direction of travel of the vehicle 1 local cloud information data on the building G3 is selected from a database 9 of a data network 8 and transmitted via a wireless interface to the data processing unit 4 of the camera surround view system 2. The cloud information data received are inserted at the appropriate point in the live video image stream. The driver receives useful information data, for example the name of the Italian restaurant, "Bella Italia", and further information, such as for example the desired telephone number for reservations "089/123456". In a further possible embodiment, the driver can then press on a displayed link, for example the telephone number, and a call is immediately made to the restaurant displayed, so that the driver can conveniently make a table reservation at the restaurant whilst travelling in vehicle 1. It is also possible for the driver, by pressing displayed buttons, to receive further special information concerning the object of interest. For example, if in the displayed cloud information the restaurant has a menu symbol, the driver can press this and the menu is displayed to him. In a further possible embodiment by pressing a button the menu displayed can also be read out to the driver while they are driving, so that he is not distracted from driving. Furthermore, by pressing another button the driver can receive photographs of the inside of the restaurant, e.g. an image gallery display.

Further alternative embodiments are possible. For example, the driver in a possible embodiment is made aware of objects of interest on the side of the street S, for example by an acoustic signal. For example, at a certain point on the route, for example 100 m before he passes building G3, the driver of the vehicle 1 can be made aware by an acoustic signal that in 100 m he will be passing an Italian restaurant. The driver can for example by touching the screen or the display unit 5 select the announced object. In a further possible alternative embodiment, the driver can confirm the acoustic enquiry with a command word, so that cloud information data on the object of interest are automatically downloaded, without the driver having to touch the display unit 5. In this alternative embodiment it is not necessary for the object of interest, for example the restaurant, to already be displayed on the display unit 5 at the time of selection. With the system, the object of interest, for example the restaurant shown in FIG. 4, is selected by a driver of the vehicle 1 or a passenger located in the vehicle via a user interface. In a possible embodiment this user interface has a microphone, into which the driver gives acoustic commands for selection of the object. Alternatively, the display unit 5 can serve as a touchscreen user interface. If the user interface uses display unit 5 as a touchscreen, the object is selected from the objects currently displayed in the live video image stream. It is also possible for objects to be selected which are not currently displayed, but which will come to be displayed after a short distance. This embodiment offers the advantage that the local cloud information data relating to the selected objects can be downloaded from a remote database and are already available the moment the object of interest is passed.

In a possible further alternative embodiment of the system, the driver can select or filter various types of objects. For example, the driver can select restaurants, gas stations or repair shops as an object type. In this case, in a possible embodiment the driver is simply made aware of objects corresponding to the selected object type. If for example a driver is driving through an unfamiliar city and he is looking for a suitable restaurant, he can search selectively for objects of the restaurant object type. As soon as the vehicle approaches the object of this object type, he can select this object and read the associated cloud information data, in order to make his selection.

In a further possible alternative embodiment, the system has an editor, with which the driver can produce cloud information data on an object of interest, wherein the produced cloud information data are uploaded by the driver to a database 9 of the data network 8. For example, after dining at the selected restaurant a driver can give a rating for the restaurant, which can be stored as additional cloud information data in the database 9 of the data network 8.

The system described herein is highly versatile. For example, the vehicle 1 can have a plurality of display units 5, provided for the various passengers of the vehicle 1. For example, a tourist bus on a city tour can be equipped with a plurality of display units 5, displaying to the vehicle passengers, e.g. the tourists, a live video image stream of the vehicle environment. If, for example, during the city tour a tourist is interested in a particular building that they see from the window of the tour bus, they can simultaneously select the building also displayed on the display unit 5 by touching the screen and receive associated cloud information data on this building. In this way a plurality of tourists can simultaneously receive information on different objects of interest to them. In a further possible alternative embodiment, the display unit 5 is a head-up display. In this embodiment the driver or a passenger of the vehicle can select an object visible from a window of the vehicle by touching the visible object on the window of the vehicle. In this embodiment the head-up display or the window thus serves as the user interface for selection of the object. The data network 8 shown in FIG. 1 is preferably a web of data networks, in particular the Internet. In a possible embodiment the gateway 6 of the vehicle 1 communicates via a wireless interface, in particular a mobile radio interface, with an access point of an access network, which in turn is connected to the Internet. In a further possible alternative embodiment, the system receives positional data from further signal sources, for example via satellite or by means of odometry. In a possible embodiment, a three-dimensional representation of the vehicle environment is displayed on the display unit 5. In this embodiment the objects are also shown three-dimensionally and can be selected by the driver by touching the screen.

In a further possible embodiment, the loaded local cloud information data with respect to the selected objects are stored in a local data memory of the system, so that when the object is next selected they are already available locally in the local data memory of the vehicle. In this way, access times to the cloud information data with respect to previously selected objects are minimized.

Based on the provided GPS data originating from the cloud, the position of the vehicle and the viewing angle of the virtual camera, the data processing unit 4 preferably calculates the point where the overlay data are displayed on the display or the display unit 5. Here the calculation preferably takes place in real time.

The invention claimed is:

1. A camera surround view system for a vehicle comprising at least one vehicle camera, which provides camera images, which are processed by a data processing unit in order to produce a live video image stream, which is displayed on a display unit,
   wherein the camera surround view system loads local cloud information data regarding an object shown in the live video image stream from a data network and displays the obtained local cloud information data as an overlay in the displayed live video image stream,
   wherein the data processing unit calculates a pointer from camera coordinates of the selected object, shown in the live video image stream, to GPS coordinates and sends a request via a wireless connection, in order to receive the cloud information data associated with the object from a database of the data network, and
   a data memory temporarily stores the local cloud information data downloaded over a wireless interface.

2. The camera surround view system according to claim 1, wherein the local cloud information data are downloadable from the data network as a function of a current position, direction of travel, and/or speed of travel of the vehicle and the selected object.

3. The camera surround view system according to claim 2, wherein the selected object of interest is selected by a driver of the vehicle or a passenger located in the vehicle via a user interface.

4. The camera surround view system according to claim 3, wherein the object of interest is selected by the driver or passenger, by the driver or passenger touching the object displayed on the display unit.

5. The camera surround view system according to claim 4, further comprising a gateway providing a wireless connection to the data network.

6. The camera surround view system according to claim 5, wherein the current position, direction of travel, and/or speed of travel are provided by a GPS unit of the vehicle.

7. The camera surround view system according to claim 1, wherein the surround view system receives a list of GPS coordinates and associated local cloud information data from the database of the data network via the wireless connection and calculates a pointer from the GPS coordinates to the camera coordinates, at the position of which the local cloud information data are placed in the live video image stream.

8. A method for providing information data with respect to an object of a vehicle environment of a vehicle contained in a video image stream, comprising:
   generating camera images of the vehicle environment with at least one vehicle camera of the vehicle;
   processing the produced camera images to generate a live video image stream of the vehicle environment;
   displaying the generated live video image stream on a display unit of the vehicle, wherein cloud information data regarding a selected object in the live video image stream are displayed as an overlay in the live video image stream;
   calculating a pointer from camera coordinates of the selected object, shown in the live video image stream, to GPs coordinates;
   sending a request via a wireless connection in order to receive the cloud information data associated with the object from a database, wherein the local cloud information is downloaded over a wireless interface and is temporarily stored in a data memory.

9. The method according to claim 8, further comprising downloading local cloud information data from a data network as a function of a current position, direction of travel, and/or speed of travel of the vehicle and the selected object.

10. The method according to claim 9, wherein the selected object of interest is selected by a driver of the vehicle or a passenger located in the vehicle via a user interface.

11. The method according to claim 10, wherein the object of interest is selected by the driver or passenger, by the driver or passenger touching the object displayed on the display.

12. The method according to claim 8, wherein via the wireless connection a list of GPS coordinates and associated local cloud information data are transmitted from the database of the data network and a pointer is calculated from the GPS coordinates to the camera coordinates, at the position of which the local cloud information data are placed in the live video image stream.

\* \* \* \* \*